F. P. PETZOLD.
INSERTED TOOTH SAW.
APPLICATION FILED OCT. 28, 1921.

1,434,629.

Patented Nov. 7, 1922.

Inventor
Ferdinand P. Petzold

By Fred G. Dieterich
Attorneys

Patented Nov. 7, 1922.

1,434,629

UNITED STATES PATENT OFFICE.

FERDINAND P. PETZOLD, OF MONTREAL, QUEBEC, CANADA.

INSERTED-TOOTH SAW.

Application filed October 28, 1921. Serial No. 511,027.

*To all whom it may concern:*

Be it known that I, FERDINAND P. PETZOLD, citizen of the Dominion of Canada, residing at Montreal, in the Province of Quebec, Canada, have invented certain new and useful Improvements in Inserted-Tooth Saws, of which the following is a specification.

This invention relates to an inserted tooth for saws and particularly to the manner of positively securing the same in the saw plate.

The device is immediately related to that on which Patent No. 1,120,969 was granted to the present applicant on the 15th December, 1914, and is an improvement thereon designed to provide a more direct and positive means retaining the tooth in the plate, and a means for releasing the retaining means that does not involve perforation of the saw plate.

The retaining means embodied in the patent above referred to is not positive, offering as it does a backwardly yielding rounded projection engaging a correspondingly rounded recess in the tooth shank seat in the saw plate, from which recess the rounded projection of the tooth was forcibly expressed by a lever key pin fulcrumed in an aperture in the saw plate.

While this retaining means is all sufficient when new, after repeated renewals, the wear of the outer corners of the recess will permit the tooth to work in its seat in the plate and it becomes ineffective as a retaining means.

It is further considered objectionable to have the saw plate perforated for the fulcrum pin of the releasing key.

It is to overcome these objections that the improvements which are the subject of this application have been devised.

The invention is particularly described in the following specification, reference being made to the drawings by which it is accompanied, in which.

Figure 1:
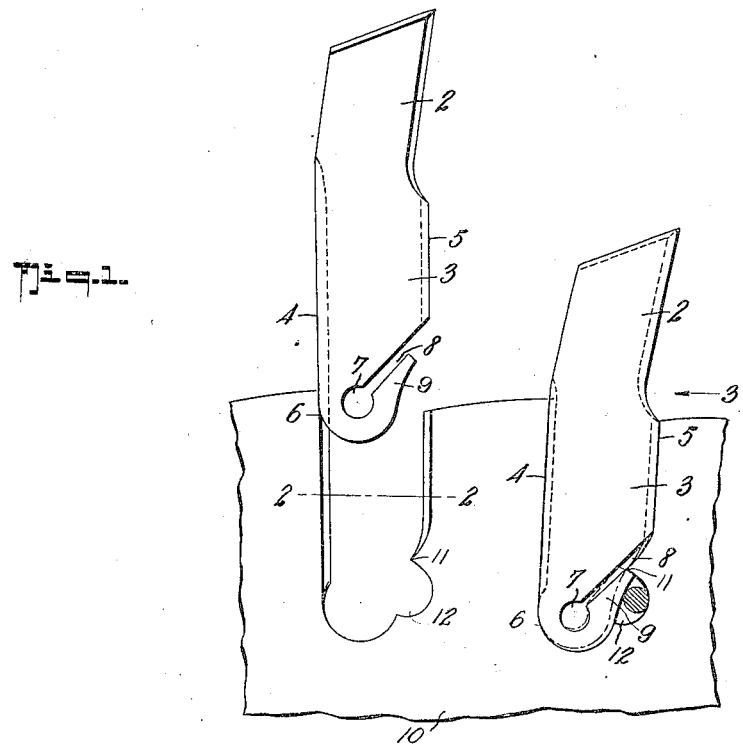
Fig. 1 is a side view of a portion of the saw plate with two of the teeth, one of which is withdrawn from its seat in the plate.
Figure 2:
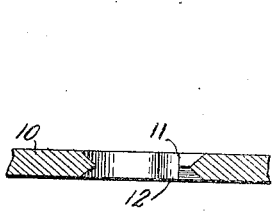
Fig. 2 is a section on the line 2—2 in Fig. 1.
Figure 3:
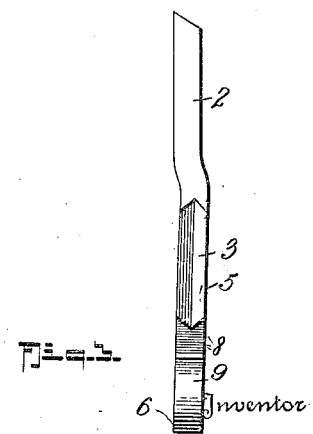
Fig. 3 is an edge view of the tooth shank in the direction of the arrow 3 in Fig. 1.

The cutting part 2 of the saw tooth, which may be of any suitable form, has a shank portion 3 which is seated within the saw plate 10.

This shank portion 3 has sides 4 and 5 which are parallel to one another. One of these 4 is longer than the other 5 and merges into a rounded end 6 which is apertured as at 7.

From the aperture 7 a slit 8 extends angularly to the inner end of the shorter parallel side 5. That portion of the shank between the slit 8 and the rounded end 6 forms a resilient tongue 9, the end of which is squared or curved to the radius of flexure, to form a retaining check to hold the tooth in its seat in the plate of the saw in a manner to be described later.

The parallel sides 4 and 5 of this bit shank are in cross section V grooved, the groove of the longer side 4 terminating adjacent the commencement of the rounded end 6 and that of the shorter side 5 at the angled slit 8.

The seat in the saw plate 10 for the shank of this tooth has the edges of its sides V shaped in cross section to fit the V grooves of the sides 4 and 5 of the shank of the tooth, that of the shorter side 5 terminating at the location of the slit 8 and therefrom that side projects inward as at 11 to form an engagement for the end of the tongue 9 and from the underside of this projection 11 a concavity 12 is formed in the plate.

The shank 4, 5, 6 of the tooth 2 may thus be inserted in the seat provided for it in the saw plate 10, and on being driven endwise down the parallel sides of that seat, the end of the tongue 9 will, by the angled slope of the upper side of the projection 11, be pressed in, until the end of the projection is passed, and will thereafter spring out and retain a positive hold of the underside of the projection, resisting withdrawal.

This positive endwise engagement of the end 9 on the tooth with the underside of the projection 11 of the tooth seat in the saw plate constitutes the essential feature of the improvement, not only because of its positive character, but further because it lends itself to a means for release that does not require a fulcrum pin hole in the plate. Any means that will forcibly press the free end of the tongue 9 toward the upper side of the slit 8 to clear the end of the projection 11 will serve this object.

For example, a tapered drift pin may be applied in the concavity 12, as shown to the right of Fig. 1.

The tooth and its seat not only constitute a distinct improvement of that previously patented, but it has the further important advantage that the tooth can be applied to exising saw plates with slight change in the seats thereof.

As shown in the drawing, the tongue 9 is directed angularly toward that side of the tooth which has the cutting edge, but it must be distinctly understood that it may be directed to either side.

Having now particularly described my invention, I hereby declare that what I claim as new and desire to be protected in by Letters Patent, is:

1. An inserted tooth for saws, said tooth having a parallel shank portion adapted to fit along the greater part of both edges in a seat provided for it in the saw plate, the inner end of said shank having at the inner end a resilient tongue angularly projecting outward toward one of the edges of the inserted portion of the tooth, the end of said tongue being normal to the angle of the tongue and adapted to engage a corresponding projection from the seat of the tooth in the saw plate.

2. An inserted tooth for saws, said tooth having a parallel shank portion adapted to fit along both edges in the saw plate, the inner end of said shank being rounded and having an aperture through it with a slot extending angularly outward from the aperture to one of the edges leaving a resilient tongue flexing at the end of the tooth, the end of which tongue is normal to the slot and the seat in the plate having a corresponding inward projection to engage the end of the tongue.

In testimony whereof I affix my signature.

FERDINAND P. PETZOLD.